April 12, 1966   R. L. CALDWELL   3,246,152
METHOD OF COMPENSATING FOR THE IRON CASING EFFECT IN
RADIOACTIVE WELL LOGGING
Filed Sept. 14, 1961   3 Sheets-Sheet 1
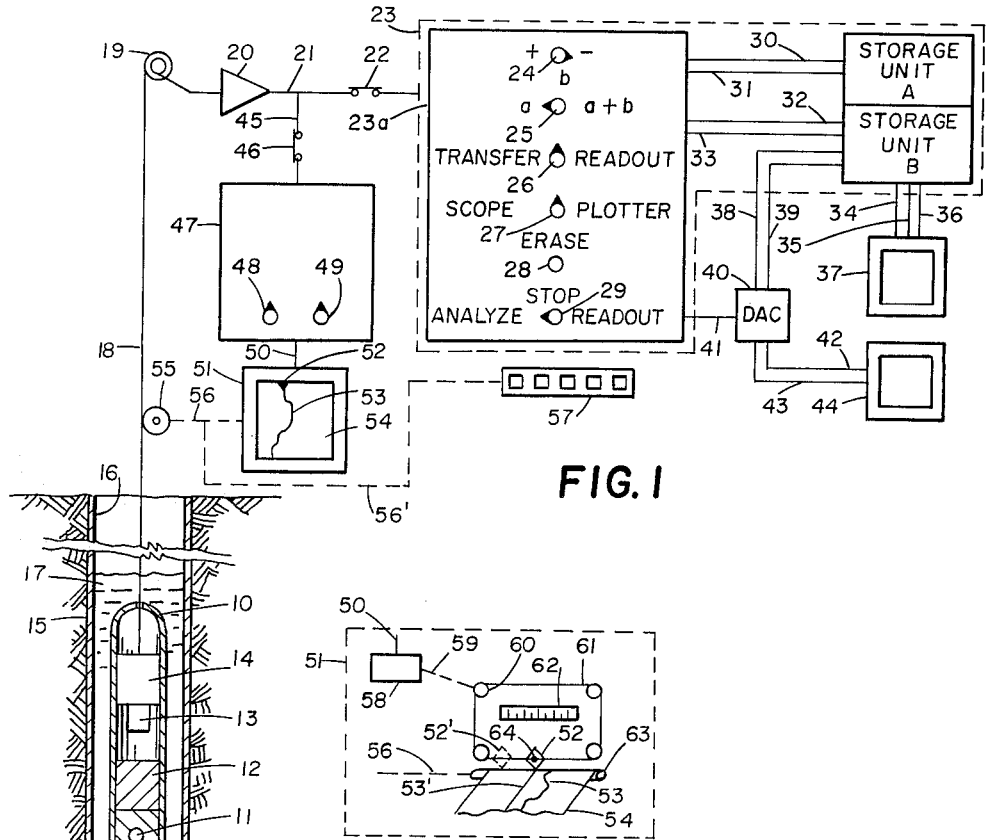
FIG. 1
FIG. 4.
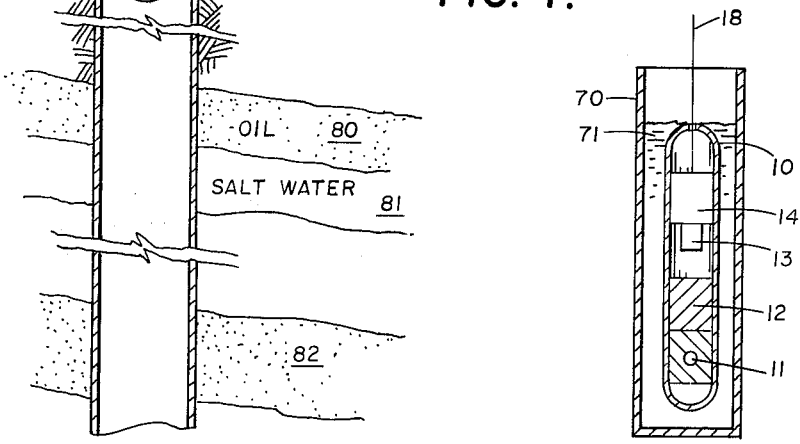
FIG. 2.

United States Patent Office 3,246,152
Patented Apr. 12, 1966

3,246,152
METHOD OF COMPENSATING FOR THE IRON CASING EFFECT IN RADIOACTIVE WELL LOGGING
Richard L. Caldwell, Dallas, Tex., assignor to Socony Mobil Oil Company, Inc., a corporation of New York
Filed Sept. 14, 1961, Ser. No. 138,150
6 Claims. (Cl. 250—83.3)

The present invention relates to radioactive well logging and more particularly to an improved method for obtaining radioactive logs of the formations traversed by a borehole which logs are free from background radiation which interferes with the proper identification of elements within the formations.

It is well known that the capture of thermal neutrons by the nuclei of elements results in the prompt release of gamma rays. Since these gamma rays are characteristic of the capturing elements, they may be utilized for identifying the elements found in formations traversed by a borehole.

In porous formations which are known to contain negligible fresh water, the absence of salt water will usually suggest the presence of oil. Thus, by determining the presence of chlorine, primarily as sodium chloride dissolved in water, it is possible to distinguish between oil and salt water in such formations. The presence of chlorine can be distinguished from other elements in the formations since the prominent neutron-capture gamma rays emitted by chlorine when irradiated with thermal neutrons are of very high energy. In addition, since the neutron-capture cross section of chlorine is much greater than that of other elements commonly present in formations, the neutron-capture gamma rays detected at the high energies will be predominantly those of chlorine if chlorine is present in the formations. Furthermore, the count rate of the high energy neutron-capture gamma rays of chlorine will vary with the concentration of chlorine in the formations.

As is well known in the art, these factors can be utilized to determine the presence of chlorine by spectral analysis or by continuous logging processes. For example, a multichannel analyzer and an oscilloscope may be interconnected with a gamma ray detector of a radioacitve well logging system to obtain a spectrum of the neutron-capture gamma rays detected within a borehole. The spectrum can then be analyzed at high energies for the spectral peaks formed by the prominent neutron-capture gamma rays of chlorine.

In addition, as is well known in the art, an energy discriminator and a continuous recorder may be interconnected with a gamma ray detector of a radioactive well logging system to obtain a continuous trace representative of the total integrated count rate of the neutron-capture gamma rays detected at high energies. By adjusting the discriminator to be responsive to high energy neutron-capture gamma rays only, the chlorine effect may be accentuated. If chlorine is present in the formation, the variations of the trace will be proportional to the variations of the concentration of chlorine.

Many wells which have been cased with iron are again being logged today to locate possible oil-bearing formations. One of the problems encountered in logging such wells for chlorine is that the neutrons from the source also interact with the iron of the borehole casing and the iron of the logging instrument. The neutron-capture gamma rays of iron are also of high energy and overlap those of chlorine, thus forming an undesirable background. Furthermore, the prominent neutron-capture gamma rays of iron exist at nearly the same energy levels as those of chlorine. The nature of the prominent neutron-capture gamma rays of iron are such that they obscure the spectral peaks of the prominent neutron-capture gamma rays of chlorine. Thus, when logging for chlorine in an iron environment, it is difficult to determine whether chlorine is present within the formation by analyzing the spectral peaks within the energy range at which the prominent neutron-capture gamma rays of chlorine exist. In addition, within the energy range at which the prominent neutron-capture gamma rays of chlorine exist, the total count rate of the neutron-capture gamma rays emitted from a salt water-saturated formation in an iron environment is similar to the total count rate of the neutron-capture gamma rays emitted from an oil- or water-saturated formation in an iron environment. Therefore, it is also difficult to determine by a continuous log whether chlorine is present in formations traversed by a borehole when logging through iron casing and when using logging instruments of iron.

To obtain an accurate indication of the chlorine content of the formation, the radioactive logs produced must be free from the effect of the iron background radiation. In accordance with the present invention, the effect of the iron background radiation is removed or reduced by employing a correction function derived from the neutron-capture gamma rays emitted from iron. In a more specific aspect, the invention may be carried out by obtaining the spectrum or the count rate of the neutron-capture gamma rays emitted from iron itself and subtracting this from the spectral log or from the continuous log obtained from within the iron-cased borehole. Where the formation is to be analyzed by spectral analysis, the spectrum of the neutron-capture gamma rays of iron may be obtained separately and then combined with the neutron-capture gamma ray spectrum of the formation obtained within an iron cased borehole in order to obtain a resultant spectrum free from iron background. If the effect of iron is removed from the spectrum, the spectral peaks of the prominent neutron-capture gamma rays of chlorine will be accentuated and not obscured by the prominent neutron-capture gamma rays of iron and therefore may be more easily identified.

Where the formation is to be analyzed for chlorine by continuous logging processes, an indication representative of the total integrated count of the neutron-capture gamma rays emitted by iron within the desired energy range may be obtained separately. This indication may be the distance which the pen of a continuous recorder is deflected when the detector of the radioactive well logging system is irradiated with the neutron-capture gamma rays of iron within the desired energy range. The amount of deflection can then be subtracted from the continuous trace obtained when the borehole is being logged to produce a continuous log free from iron background radiation.

In accordance with the present invention, a radioactive log of the formation traversed by a borehole is produced, which log is free from background radiation emitted from the environment within the borehole when the formation is irradiated with primary radiation. A synthetic environment productive of secondary radiation representative of the background radiation is irradiated with primary radiation. The secondary radiation emitted by the synthetic environment is detected, and a first function representative of the secondary radiation emitted by the synthetic environment is obtained. The formations traversed by the borehole are then irradiated with primary radiation. A second function representative of the secondary radiation detected within the borehole is obtained, and the two functions are compared to obtain a log free from background radiation.

Accordingly, one of the objects of the invention is to obtain a spectral log representative of secondary radiation emitted when the formations traversed by a borehole are irradiated with primary radiation, which spectral log is free from background secondary radiation emitted by an environment within the borehole when the formations are irradiated with the primary radiation.

Another object of this invention is to obtain a continuous radioactive log free from such background secondary radiation.

For further objects and advantages of the invention and for a more complete understanding thereof, reference may now be had to the following detailed description taken in conjunction with the accompanying drawings wherein:

FIG. 1 diagrammatically illustrates a well logging system embodying the present invention;

FIG. 2 illustrates a well logging instrument positioned within a synthetic environment for the purpose of obtaining background radiation;

Figure 5:
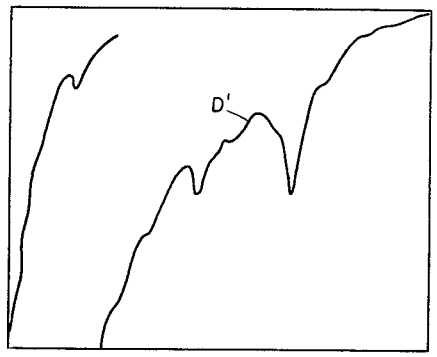
Figure 6:
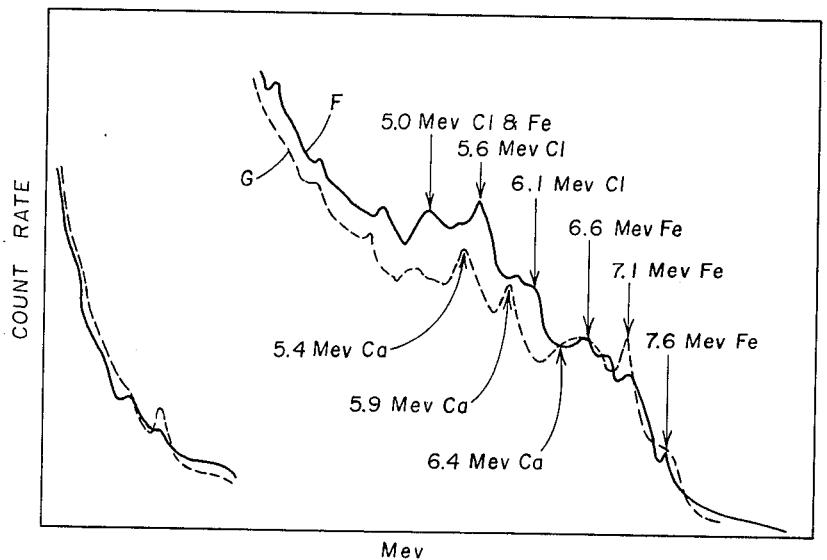
Figure 7:
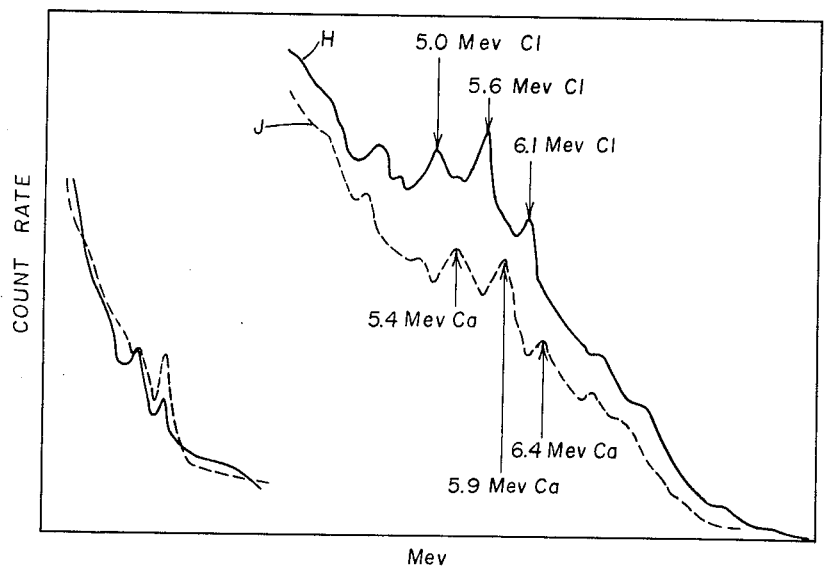

FIG. 4 diagrammatically illustrates a continuous recorder used in the radioactive well logging system;

FIG. 5 illustrates a neutron-capture gamma ray spectrum as negatively stored within a multichannel analyzer of the radioactive well logging sytem;

FIG. 6 illustrates neutron-capture gamma ray spectra of calcium and iron and of a calcium, chlorine, and iron useful in the understanding of the present invention; and FIG. 7 illustrates neutron-capture gamma ray spectra of calcium and of chlorine and calcium useful in the understanding of the present invention.

Referring now to FIG. 1 of the drawings, there is disclosed a porous formation 82 traversing a borehole 15 cased with iron casing 16, which formation may be of unknown properties and which may have been located by a conventional neutron log or by a continuous log of the present invention. This formation may be examined more thoroughly by irradiating the formation with primary radiation or neutrons from the source 11 of the logging instrument 10 and producing a spectrum, for analysis, from the prompt neutron-capture gamma rays detected by the detector 13. By analyzing the spectrum to determine whether there are any spectral peaks formed by the prominent neutron-capture gamma rays of chlorine, it can be determined whether the formation contains chlorine or oil. One of the problems encountered which makes the analysis difficult is that the neutron-capture gamma rays emitted by the iron of the casing 16 form a background which obscures some of the prominent chlorine peaks. To obtain a more accurate analysis, the iron background radiation should be removed from the spectrum.

A neutron-capture gamma ray spectrum free from the iron-capture gamma rays can be produced with the system shown in FIG. 1, interconnected with the logging instrument, and with the background producing means shown in FIG. 2. Also included as part of the system of FIG. 1 is an arrangement for producing a continuous log free from iron background radiation.

As shown in FIG. 1, a multichannel pulse height analyzer 47 are interconnected with the detector 13. An oscilloscope 44 and an X–Y plotter 37 are interconnected with the analyzer 23 for visually displaying and recording the energy spectrum of the secondary radiation emitted by the formation upon the irradiation thereof with primary radiation. A continuous trace recorder 51 is interconnected with the analyzer 47 for recording a continuous trace representative of the total integrated count of the secondary radiation detected within a particular energy range as the logging instrument is moved along the borehole.

Before the borehole is logged, a record is made of the secondary radiation background emitted by the iron of the casing and by the iron of the logging instrument when irradiated by primary radiation from the source 11. This is done by inserting the logging instrument within the synthetic environment or iron tank 70 of FIG. 2 whereby the iron background secondary radiation to be encountered within the borehole may be produced and recorded for use in producing a spectrum or a continuous log free from the iron background secondary radiation.

The logging instrument used for the logging operation preferably has a source 11 which emits fast neutrons and a scintillation crystal detector 13 of gamma rays. A shield 12 is provided to shield the detector from direct radiation from the source. The fast neutrons emitted by the source become thermalized when they interact with the liquid 17 in the borehole and with the constituents of the formations. These thermal neutrons are captured by the nuclei of the formation which in turn emit prompt gamma rays. The gamma rays which strike the detector 13 produce flashes of light which are converted by the photomultiplier tube 14 to electrical pulses having magnitudes proportional to the energy of the gamma rays striking the detector.

The electrical pulses are applied to an amplifier 20 by way of conductor 18 which passes over pulley 19 and then to the multichannel analyzer 23 by way of conductor 21 and closed switch 22. The multichannel analyzer has a plurality of channels, for example, 128 channels. The electrical pulses from conductor 21 are sorted by the multichannel analyzer and directed into particular channels depending upon the magnitude of the pulses. Within each channel the pulses are stored and counted. The output of the multichannel analyzer is applied to an X–Y plotter 37 and to an oscilloscope 44 which produce and display a plot of intensity of gamma ray count versus energy in mev., since each channel corresponds to a particular value in mev.

Figure 3:
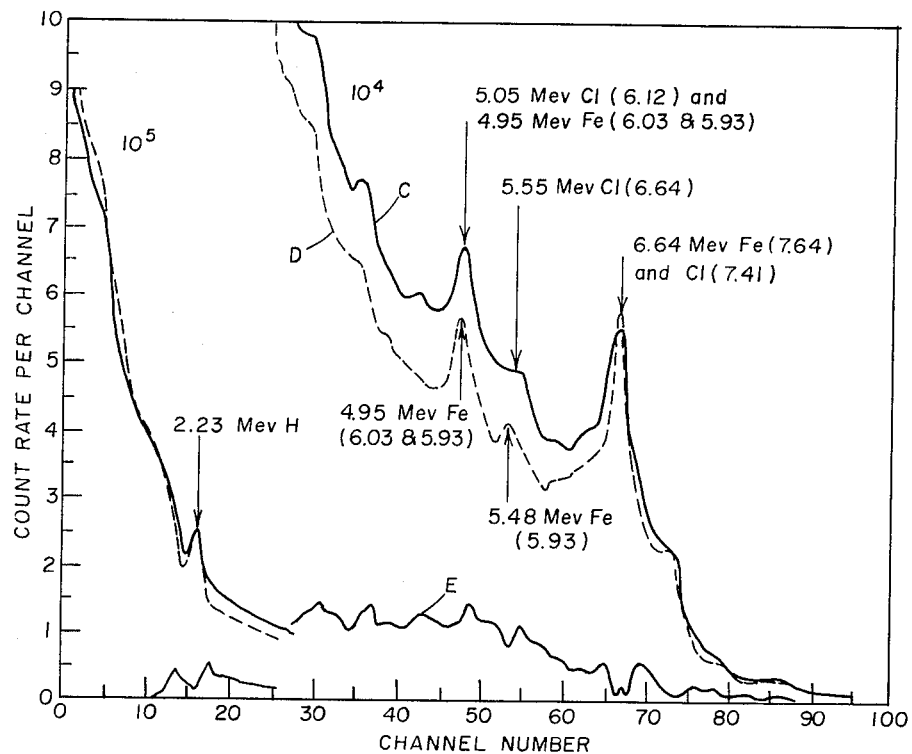
FIG. 3 illustrates neutron-capture gamma ray spectra of iron, iron and chlorine, and chlorine useful in the understanding of the present invention.

Such a plot or gamma ray spectrum is shown in FIG. 3 of the drawings wherein there is disclosed curve D which is a function representative of the neutron-capture gamma ray spectrum of iron, and curve C, which is a function representative of the neutron-capture gamma ray spectrum of iron and chlorine as obtained experimentally with the radioactive logging system. The spectrum D was obtained by filling the iron tank 70 with oil 71 and inserting the logging instrument within the tank. The neutrons emitted from the source 11 are thermalized by the oil 71 and captured by the nuclei of the iron, which in turn emit the gamma ray spectrum. The 2.23 mev. peak also shown in FIG. 3 is due to the hydrogen of the oil. The spectrum C of iron and chlorine was obtained experimentally by filling the tank 70 with salt water. Curve E, which is a function representative of the neutron-capture gamma ray spectrum of chlorine, was obtained by subtracting curve D from curve C.

As can be seen from Table I below and from FIG. 3, the prominent neutron-capture gamma rays of iron not only extend over an energy range which includes the prominent neutron-capture gamma rays of chlorine but the spectral peaks formed by the prominent neutron-capture gamma rays of iron also occur at nearly the same energy levels as do the spectral peaks formed by the prominent neutron-capture gamma rays of chlorine.

As is well known in the art, these spectral peaks result from the pair-production effect. When a high-energy gamma ray strikes a typical scintillation crystals detector, an electron-positron pair is produced. Upon the annihilation of the positron, there are produced two annihilation quanta each having an energy of substantially one-half mev. Neither of these annihilation quanta may escape from the crystals, or only one of the two may escape, or both may escape. Accordingly, each such neutron-capture gamma ray from a particular excited nucleus may surrender its total energy to a detector, or its total energy minus substantially one-half mev., or its total energy minus substantially one mev.

Table I

| | Gamma Ray Energy | Predicted Energy of Detected Peaks | | |
|---|---|---|---|---|
| | | No Escape | One Escape | Two Escape |
| Iron | 5.93 | 5.93 | 5.42 | 4.91 |
| | 6.03 | 6.03 | 5.52 | 5.01 |
| | 7.64 | 7.64 | 7.13 | 6.62 |
| Chlorine | 6.12 | 6.12 | 5.61 | 5.10 |
| | 6.64 | 6.64 | 6.13 | 5.62 |
| | 7.41 | 7.41 | 6.90 | 6.39 |

From FIG. 3 it can be seen that the gamma ray spectrum of iron is similar in many respects to the gamma ray spectrum of iron and chlorine, especially at an energy range above about 6.4 mev. Above 6.4 mev., the gamma rays detected were predominantly those of iron. The neutron-capture gamma rays of iron thus tend to obscure the spectral peaks formed by the prominent neutron-capture gamma rays of chlorine. This can be seen from FIG. 3 wherein the 5.05 mev. and the 4.95 mev. spectral peaks are formed by the neutron-acpture gamma rays of both iron and chlorine. This is also true of the 6.64 mev. spectral peak of FIG. 3.

FIGS. 6 and 7 disclose the effect which iron background radiation may have on the gamma ray spectra of the formation. Curve G of FIG. 6 represents the neutron-capture gamma ray spectrum of iron and fresh water or oil in a limestone formation, and curve F represents the neutron-capture gamma ray spectrum of iron and salt water in a limestone formation. It can be seen that the 6.1 mev. spectral peak of chlorine on curve F is more or less obscured and the 5.0 mev. spectral peak on curve F is due to both iron and chlorine. Furthermore, the two curves are very close together, especially at energies above 6.4 mev.

Curve J of FIG. 7 represents the neutron-capture gamma ray spectrum of fresh water or oil in a limestone formation, and curve H represents the nuetron-capture gamma ray spectrum of salt water in a limestone formation. In the absence of iron, it can be seen that the 6.1 mev. spectral peak of chlorine on curve H is accentuated and the 5.0 mev. spectral peak is due to chlorine only. In addition, the two curves of FIG. 7 are much further apart than the two curves of FIG. 6.

Thus, it can be seen that the presence of iron-capture gamma rays obscures the spectral peaks formed by the prominent neutron-capture gamma rays of chlorine. In the absence of iron-capture gamma rays, the spectral peaks of chlorine are accentuated, thus making identification easier. In addition, it is easier to distinguish between the gamma ray spectrum of salt water in a limestone formation and the gamma ray spectrum of fresh water or oil in a limestone formation if iron is absent from the environment due to the large separation between the two spectra. This is very important when obtaining the total count of the neutron-capture gamma rays for the purpose of producing a continuous log.

Reference is now made primarily to FIG. 1 for an understanding of the manner in which a spectrum free from iron background radiation may be obtained. The logging tool is first placed within the synthetic environment 70 and the output of the amplifier applied to the multichannel analyzer 23. The spectrum from the analyzer will be applied to the storage unit A by way of conductors 30 and 31; and for purposes of subtracting the background spectrum from the spectrum obtained within the wellbore at the point of interest, the output of the multichannel analyzer will first be made negative. Accordingly, switch 24 on the instrument panel 23a is placed in the negative position. Switch 25 is now placed in position $a$, effectively employing half the channels of the multichannel analyzer for the production of the background spectrum. While any number of channels may be employed in the unit now available, 128 are employed. Switch 29 is now placed in the analyze position to start the operation of the analyzer. After a predetermined period of time, or after a predetermined number of reference counts, the analyzer is stopped by moving the switch 29 to the stop position. Switch 25 is then moved to the $a+b$ position, and switch 26 is moved to the transfer position to transfer the negative spectrum stored in storage unit A to storage unit B without affecting the storage of information in unit A. With the background spectrum now stored negatively in storage unit B, as illustrated by curve D' of FIG. 5, the logging tool can be located within the borehole at a point of interest. Switch 24 is then moved to the positive position, switch 25 moved to position $b$ to employ the other half of the channels in the multichannel analyzer, and the switch 29 now returned to the analyze position so that the spectrum from the analyzer, due to the gamma rays detected within the borehole, may be applied to the storage unit B by way of conductors 32 and 33.

It will be recalled that the effect of negatively storing the background spectrum in storage unit B effectively provides a reference, in this case a negative spectrum, to which the spectrum representative of the wellbore environment at the point of interest is to be added. The net effect is to subtract one spectrum from the other to obtain a resultant spectrum. As a result, there is finally stored within the storage unit B a spectrum representative of earth characteristics adjacent the wellbore at the point of interest free of induced background radiation.

The reference stored in unit B is transferred to the X–Y plotter 37 by way of conductors 34, 35, and 36 in the following manner:

With switch 24 in the positive position and switch 25 in position $b$, switch 27 is moved to the plotter position and switch 29 moved to read-out position. The storage unit now feeds to the X–Y plotter 37 information identifying the first channel and information regarding the magnitude or the number of counts stored on the first channel. The X–Y plotter 37 comes to balance and after a predetermined period of time, in one case 0.8 second, the storage unit over conductor 36 commands the plotter to print and then the storage unit effectively moves to read out the information on the next channel.

The above description discloses the read-out 37 as an X–Y plotter; however, an adding machine could be utilized instead, as is well known in the art, to record the actual number of counts per channel.

The reference stored in unit B can also be transferred to the oscilloscope 44 connected to the multichannel analyzer 23 by way of conductors 38, 39, 41, digital analog converter 40, and conductors 42 and 43 so that the information in the storage may be displayed on the face of the cathode ray tube. For this purpose, the switch 27 is moved to the scope position.

The information regarding the background spectrum is at all times stored in the storage unit A. In order to make a net spectrum of another point in the borehole, stored information in the storage unit B must be erased. This is done by maintaining the switch 25 in the $b$ position and by closing erase switch 28. By observing the cathode ray oscilloscope, it can be determined if the information in the storage unit B has been erased.

The multichannel analyzer can also be used to produce or display on the X–Y plotter 37 and on the oscilloscope 44 a spectrum of the background radiation obtained with the logging instrument within the tank 70 or a spectrum of the formation traversed by the iron-cased borehole. In the latter case, the spectrum would include the iron background radiation due to the iron of the borehole casing and due to the iron of the logging instrument. This is done by applying the output from conductor 21 directly to storage unit B. Switch 24 is moved to the positive position, switch 25 is moved to position $b$, and switch 29 is moved to the analyze position so that the spectrum from the analyzer, due to the gamma rays detected from the iron tank 70 or due to the gamma rays detected within the iron-cased borehole, may be applied to the storage B by way of the conductors 32 and 33. The gamma ray energy spectrum stored in the unit B can then be transferred to the X–Y plotter 37 or to the oscilloscope 44 in the same manner as described above.

The analysis of a spectrum of a formation of unknown properties can also be done by comparing the spectrum of the formation of unknown properties with the spectrum of a formation of known properties traversed by the same borehole. For example, it may be known that formation 80 of FIG. 1 is a limestone formation saturated with oil and that formation 81 is a limestone formation saturated with salt water. The properties of formations 80 and 81 may have been determined from prior logging operations or may have been determined from the analysis of gamma ray spectra free from iron background radiation obtained by use of the present invention. In either case, gamma ray spectra of formations 80 and 81 free from the iron background radiation are produced with the system of the present invention. The resultant spectra may appear as curves J and H of FIG. 7, respectively. With the iron background radiation still in the multichannel analyzer 23, the logging instrument can be lowered to formation 82 to obtain a spectrum of the formation free from the iron background radiation. If the resultant spectrum of formation 82 exhibited on the oscilloscope 44 or on the X–Y plotter 37 corresponds with either curve H or curve J, then it can be determined that the formation 82 is a limestone formation saturated with salt water or a limestone formation saturated with oil, respectively. A depth meter 57, interconnected with a cable-measuring element 55 by way of coupling member 56', is utilized to determine the depth in feet at which each spectrum is obtained.

In addition, many wells which have been cased with iron are today being explored again to locate the interface between known salt water-saturated formations and known oil-saturated formations. For example, the interface between the two formations 80 and 81 can be located by using the gamma ray spectrum of one of the formations as a reference. With iron background radiation stored in the multichannel analyzer, a spectrum of formation 80 free from iron background radiation can be obtained. This spectrum may appear as curve J of FIG. 7. With the background radiation still in the multichannel analyzer 23, the logging instrument can be moved downwardly. The interface can be located by determining the depth of the logging instrument when curve J changes in shape to that of curve H. The two curves can be easily distinguished by their difference in height and by the different positions of the prominent spectral peaks of the two curves. It is to be noted that the three prominent peaks of the curve H are to the left of the three prominent peaks of the curve J. The three prominent spectral peaks of curve J are in effect shifted to the left when the logging instrument is moved from formation 80 to formation 81. Since the neutron-capture cross section of chlorine is greater than that of limestone, the probability of neutron capture by chlorine is greater than that of calcium; and the chlorine nuclei will thus emit more prominent gamma rays than calcium, resulting in the chlorine peaks, rather than the calcium peaks, being more prominent in the gamma ray spectrum.

In the above two examples relating to the determination of the constituents of formations of unknown properties and to the location of the interface between two formations of known properties, spectra free from iron background radiation were utilized in order to accentuate the chlorine peaks and to obtain a greater separation between the curve representative of the gamma ray spectrum of a chlorine-saturated formation and the curve representative of the gamma ray spectrum of an oil-saturated formation. However, it is also possible to leave the iron background in the spectra and compare the spectrum of interest with the reference spectrum point by point. If the spectrum of interest has the same shape as the reference spectrum, then it can be determined that the elements present in the formation of interest are the same as those present within the reference formation. This procedure can be followed in comparing the spectrum of formation 82 with the spectra of formations 80 and 81 when the properties of formations 80 and 81 have been determined by prior logging operations and the necessity of producing gamma ray spectra free from iron background radiation for careful analysis does not exist.

In addition to the production of gamma ray spectra free from iron background radiation, it is important when producing continuous radioactive logs to produce such logs free from iron backgrund radiation when logging for chlorine in an iron environment. Since the trace of a continuous radioactive log is representative of only the total count of the neutron-capture gamma rays detected, it is difficult to determine whether the variations of the trace are due to the presence of chlorine when logging in an iron environment. For example, the total count under curve G of FIG. 6, which may represent the gamma ray spectrum of iron and oil in a limestone formation, is not much greater than the total count under curve F, which represents the gamma ray spectrum of the iron and salt water in a limestone formation, since there is not much separation between the two curves. The presence of iron results in the curves being very close together, especially at an energy range in excess of 6.4 mev., at which energy range the neutron-capture gamma rays detected are predominantly those of iron, as stated above.

As stated above, if the iron background radiation is removed from curves G and F, the curves will be much further apart. This is seen in FIG. 7 wherein curve J may represent the gamma ray spectrum of oil in a limestone formation and curve H represents the gamma ray spectrum of salt water in a limestone formation. Thus, the total count under curve H will be much greater than the total integrated count under curve J.

The percentage difference between curves F and G of FIG. 6 can be used as a measure of the sensitivity or the ability to distinguish between an oil-saturated formation in an iron environment and a salt water-saturated formation in an iron environment as described in application Serial No. 79,453, filed December 29, 1960, by Richard L. Caldwell and George N. Salaita. As stated therein, the greatest percentage difference or sensitivity when logging for chlorine in an iron environment is obtained within an energy range of approximately 4.6–6.3 mev. Within the same approximate energy range and in the absence of the neutron-capture gamma rays of iron, the sensitivity is 32 percent.

To produce a continuous log, the electrical pulses from conductor 21 are applied to the single-channel pulse height analyzer 47 by way of conductor 45 and closed switch 46. The output of analyzer 47 is applied to recorder 51 by way of conductor 50.

The pulse height analyzer 47 can be adjusted for response to neutron-capture gamma rays within the desired energy range by adjustment of the low-bias control 48 and the high-bias control 49, whereby only the electrical pulses having a magnitude proportional to the energy of the neutron-capture gamma rays striking the detector within the desired energy range will be passed. The output on conductor 50, which is a function proportional to the total count of the gamma rays detected by crystal 13 within the desired energy range, is then fed into recorder 51 to actuate the pen 52. In the case of chlorine present in a limestone formation traversed by an iron-cased borehole, the output on conductor 50 will be proportional to the total count under the curve F of FIG. 6 within the desired energy range. The trace recorded by the pen on the moving chart 54 will represent variations of the neutron-capture gamma ray count detected within the desired energy range.

When background information is to be applied to the recorder, the logging instrument is inserted in the iron tank 70. The output of the analyzer 47 is applied by way of conductor 50 to a self-balancing potentiometer 58 of the recorder 51 as shown in FIG. 4. The self-balancing potentiometer 58 by way of mechanical connection 59 drives one of the pulleys 60 supporting the cord 61 to move the pen 52 rigidly attached to cord 61 by screw 64, relative to the chart 54. The radiation emitted by the iron of the tank and the iron of the logging instrument will thus cause the pen to move to the right, relative to the chart. The pen will come to rest at the balance point of the system. Since the gamma ray count due only to the iron background radiation will not vary but will be constant, the distance which the pen moves provides an indication of the total count of the background radiation. With the pen in this position, a trace 53', which is a function representative of the level of the iron background radiation, can be recorded. With the recorder still in the balance condition, the logging instrument can be lowered into the borehole to obtain a trace 53 which, with respect to the zero position of the scale 62, is a function representative of the total count rate of the neutron-capture gamma rays detected within the borehole. The trace 53, with respect to the trace 53', represents the total neutron-capture gamma ray count of the formation to the exclusion of the iron background radiation. The roller 63, which supports the chart 54, is driven by coupling member 56 interconnected with cable-measuring element 55 so as to provide a correlation between the neutron-capture gamma rays detected within the borehole and the depth. In the alternative, after the instrument has been inserted in the tank 70 to obtain an indication of the iron background radiation, the screw 64 can be loosened and the pen moved along the cord 61 to the position 52' which is the zero position on the scale 62. At position 52', the pen is rigidly attached to the cord by tightening screw 64. With the recorder still in the balance condition, the logging instrument is lowered within the borehole with the pen attached to the cord at position 52'. The resultant trace recorded on the chart will provide an indication of the total gamma ray count free from background radiation.

A log free of background radiation can also be made by measuring the distance which the pen shifts when the background radiation is fed into the analyzer. This distance can then be subtracted point by point from the continuous trace recorded as the instrument is lowered down the borehole.

The above description relating to continuous logging discloses the use of the synthetic environment or iron tank 70 for background-producing purposes when logging for chlorine; however, prior to the production of background, the iron tank 70 can also be used to calibrate the energy discriminator 47 for response to a desired energy range. The use of an iron tank or synthetic environment for calibration purposes is described in my application Serial No. 115,502, filed June 7, 1961, now United States Patent No. 3,213,279.

In the application of continuous logging and spectral logging to borehole use, it is to be noted that a formation of interest can be located from a continuous log and then examined more thoroughly by spectral analysis. When a continuous log is being made, the multichannel analyzer 23 is usually disconnected by opening switch 22 since a spectrum displayed on the scope or recorded on the X-Y plotter 37 may not be accurate if the logging instrument is continually moving. Similarly, when a spectral log is being made, the pulse height analyzer 47 can also be disconnected if desired by opening switch 46.

In one embodiment of the present invention, the source 11 was a capsuled neutron source of the plutonium-beryllium type. The shield 12 was of tungsten, and the detector 13 was a sodium iodide crystal. The photomultiplier instrumentation 14 included a DuMont Photomultiplier, Type 6292. The pulse height analyzer 47 was of the type manufactured by the Hamner Electronics Co., Princeon, New Jersey, Model N-302, and the multichannel analyzer 23 was of the type manufactured by the Nuclear Data, Inc., Milwaukee, Wisconsin, and identified as Model ND 101. The X-Y plotter 37 was of the type manufactured by the Moseley Company, Pasadena, California, Model No. 2.

Having described the invention, it will be understood that modifications may now suggest themselves to those skilled in the art, and it is intended to cover all those as fall within the scope of the appended claims.

What is claimed is:

1. A method of radioactive logging of formations traversed by an iron-cased borehole wherein there is reduced the effect of iron background secondary radiation produced by the iron of the borehole casing when irradiated with primary radiation, comprising the steps of: prior to logging, irradiating with said primary radiation an iron environment free of chlorine and productive of secondary radiation representative of said iron background radiation, detecting the secondary radiation produced from said iron environment, obtaining a first indication representative of the count rate of said detected secondary radiation, irradiating said formations through said iron casing with said primary radiation, detecting within said borehole the secondary radiation resulting from the irradiation of said formations, producing as a function of depth a second indication representative of the count rate of the secondary radiation resulting from the irradiation of said formations, and combining said two indications to obtain a resultant indication of the count rate of secondary radiation free from iron background radiation.

2. The method of radioactive logging of formations traversed by a borehole wherein there is reduced the effect of background secondary radiation produced from an environment within said borehole when said formations are irradiated with primary radiation, comprising the steps of: prior to logging, irradiating with said primary radiation an environment similar in nature to that of said environment within said borehole for the production of secondary radiation and to derive a correction function therefrom, irradiating with said primary radiation the formations traversed by said borehole to produce secondary radiation which includes radiation from said formations and from said borehole environment, detecting said last-named secondary radiation, and reducing the effect of secondary radiation produced from said borehole environment by a magnitude determined at least in part by the magnitude of said correction function.

3. A method of producing radioactive logs of the formations traversed by an iron-cased borehole comprising the steps of irradiating the formations with neutrons, detecting neutron-capture gamma rays resulting from the irradiation of said formations to obtain intensity measurements thereof, said gamma rays detected including gamma rays emitted from elements of said formations and from said iron casing, and reducing the effect of the neutron-capture gamma rays emitted by said iron casing by an amount determined at least in part by the magnitude of a correction function derived from the intensity of neutron-capture gamma rays emitted by iron when irradiated with neutrons.

4. A method of producing radioactive logs of the formations traversed by an iron-cased borehole comprising the steps of irradiating the formations with neutrons, detecting gamma rays resulting from the irradiation of said formations to obtain intensity measurements thereof, said gamma rays detected including gamma rays emitted from elements of said formations and from said iron casing, detecting gamma rays emitted by iron, producing a correction function at least in part from said gamma rays emitted by iron, and combining said correction function and said measurements to obtain measurements primarily representative of gamma rays emitted from elements of said formations.

5. A method of radioactive logging of formations traversed by an iron-cased borehole wherein there is reduced the effect of neutron-capture gamma rays of iron detected within a predetermined energy range where prominent neutron-capture gamma rays of chlorine exist, comprising the steps of:

prior to logging, irradiating with fast neutrons an iron environment free of chlorine for the production of neutron-capture gamma rays of iron, detecting the resulting neutron-capture gamma rays of iron, producing a correction function from the detected neutron-capture gamma rays of iron, irradiating with fast neutrons the formations traversed by said iron-cased borehole for the production of neutron-capture gamma rays, detecting the neutron-capture gamma rays resulting from said last-named irradiation, producing a function representative of the intensity of neutron-capture gamma rays detected in said borehole within said predetermined energy range, and combining said correction function with said function representative of the intensity of neutron-capture gamma rays detected in said borehole to reduce the effect of neutron-capture gamma rays of iron detected within said energy range of interest.

6. A method of investigating the formations traversed by an iron-cased borehole for elements of interest, comprising the steps of:

irradiating with fast neutrons an iron environment containing hydrogen for the production of neutron-capture gamma rays, detecting the neutron-capture gamma rays, in response to the neutron-capture gamma rays detected producing a neutron-capture gamma ray energy spectrum, storing said spectrum for use during logging operations, irradiating with fast neutrons the formations traversed by said borehole for the production of neutron-capture gamma rays, detecting the neutron-capture gamma rays resulting from the irradiation of said formation, producing an energy spectrum of the neutron-capture gamma rays detected in said borehole, and comparing said two spectra to aid in carrying out the investigation of the formations.

References Cited by the Examiner

UNITED STATES PATENTS

| | | | |
|---|---|---|---|
| 2,665,385 | 1/1954 | Herzog | 250—83.6 |
| 2,666,142 | 1/1954 | Herzog | 250—83 |
| 2,705,289 | 3/1955 | Youmans | 250—83.6 |
| 2,819,408 | 1/1958 | Swift | 250—83 |
| 2,840,717 | 6/1958 | De Witte | 250—83.6 |
| 2,949,535 | 8/1960 | Scherbatskoy | 250—83.6 |
| 2,956,163 | 10/1960 | Baker | 250—83.6 |
| 2,971,094 | 2/1961 | Tittle | 250—83.3 |
| 2,986,638 | 5/1961 | Lee | 250—83.6 |
| 3,038,075 | 6/1962 | Youmans | 250—83.6 |
| 3,038,076 | 6/1962 | Scherbatskoy | 250—83.6 |
| 3,061,725 | 10/1962 | Green | 250—83.6 |
| 3,108,188 | 10/1963 | Dewan | 250—83.3 |

OTHER REFERENCES

Caldwell: Nuclear Physics in Petroleum Exploration Research," World Petroleum, April 1956, pages 59 to 63.

Caldwell: "Using Nuclear Methods in Oil-Well Logging," Nucleonics, December 1958, pages 58 to 65.

RALPH G. NILSON, *Primary Examiner.*

ARCHIE R. BORCHELT, *Examiner.*